United States Patent [11] 3,622,225

| [72] | Inventors | William W. Buchman<br>Los Angeles;<br>Samuel J. Holmes, Santa Monica; Frank J. Woodberry, Inglewood, all of Calif. |
|---|---|---|
| [21] | Appl. No. | 887,121 |
| [22] | Filed | Dec. 22, 1969 |
| [45] | Patented | Nov. 23, 1971 |
| [73] | Assignee | Union Carbide Corporation<br>New York, N.Y. |

[54] SINGLE PLATE LASER BEAM POLARIZER
7 Claims, 4 Drawing Figs.

[52] U.S. Cl.................................................. 350/152,
331/94.5, 350/147, 350/166
[51] Int. Cl........................................................ G02b 27/28
[50] Field of Search............................................ 350/152,
164, 166, 147; 331/94.1, 94.5

[56] References Cited
UNITED STATES PATENTS
2,403,731  7/1946  MacNeille ..................... 350/152

FOREIGN PATENTS
1,126,392  9/1968  Great Britain ............... 350/152

OTHER REFERENCES

Dedushkevich et al., " Neodymium Glass Laser with Plane Polarized Emission" Optics & Spectroscopy Vol. XXV, No. 4 (Oct., 1968) pp. 331– 332– 350/152

*Primary Examiner*—David Schonberg
*Assistant Examiner*—Paul R. Miller
*Attorney*—Pastoriza & Kelly ABSTRACT: A glass substrate having multilayers of alternately high and low index of refraction materials coated on one surface and positioned to intercept a laser beam at an angle of incidence of 60° provides a transmission of approximately 99 percent of the beam component whose electrical vector is parallel to the plane of incidence and a reflection of approximately 97 percent of the laser beam component whose electric field vector is perpendicular to the plane of incidence. The efficient polarization achieved by the single plate structure is realized for a specific wavelength of the incident laser light beam.

PATENTED NOV 23 1971 3,622,225

INVENTORS:
WILLIAM W. BUCHMAN
SAMUEL J. HOLMES
BY FRANK J. WOODBERRY

BY Pastoriza & Kelly
ATTORNEYS

3,622,225

SINGLE PLATE LASER BEAM POLARIZER

This invention relates to components employed in laser systems and more particularly to a highly efficient single plate polarizer for a laser beam.

BACKGROUND OF THE INVENTION

It is conventional practice to utilize polarizers for proper Q-switching operations in giant pulse laser systems. While calcite polarizers have been used for this purpose, they are expensive and susceptible to damage. As a consequence, other types of polarizers are desirable. A stack of Brewster plates has been used, but the loss of light and the cumulative tolerances make such polarizers unsatisfactory.

In an effort to overcome the foregoing limitations and reduce costs, it has been proposed to use thin optical films for polarizers. One proposed system contemplated the use of a thin film to increase the effective index of a glass plate or substrate so that when it was operated at the Brewster angle, a greater proportion of polarization would be achieved. In an actual construction, single layers of high index material were deposited on both sides of the glass substrate. While this method is useful, it is limited by the availability of high index materials for coating. Very large Brewster angles may be necessary and in such instances, there results an almost grazing incidence of the light requiring very large surfaces of glass.

BRIEF DESCRIPTION OF THE PRESENT INVENTION

The present invention provides an efficient single plate polarizer which overcomes many of the foregoing discussed problems. In accord with the invention, a given angle of incidence is chose. Multilayers of alternately high and low index of refraction material are then used to enhance transmission of one linear polarization and increase reflection of the other polarization. The extremely narrow beam width and bandwidth of most laser beams permits the use of this type of design with highly efficient results.

More particularly, the single plate polarizer comprises a substrate of glass having multilayers of alternately high and low index of refraction materials coated on one surface thereof. This substrate is positioned to intercept a laser beam at an angle of incidence chosen in advance; preferably, 60°. The multilayers are deposited with thicknesses in accordance with the particular wavelength of the laser beam, the chosen angle of incidence, and the specific indices of refraction involved including that of the glass substrate and air. The arrangement is such that very high transmission of that component of the laser beam whose electric field vector is parallel to the plane of incidence takes place and simultaneously very high reflectivity of that component of the laser beam whose electric field vector is perpendicular to the plane of incidence results.

The foregoing effects are realized as a consequence of the fact that there is a difference in the propagation of waves with the electric field vector parallel to the plane of incidence and with the electric field vector perpendicular to the plane of incidence.

BRIEF DESCRIPTION OF THE DRAWINGS

A better understanding of the invention will be had by now referring to a preferred embodiment thereof as illustrated in the accompanying drawings, in which.

DETAILED DESCRIPTION OF THE PREFERRED EMBODIMENT

Figure 1:
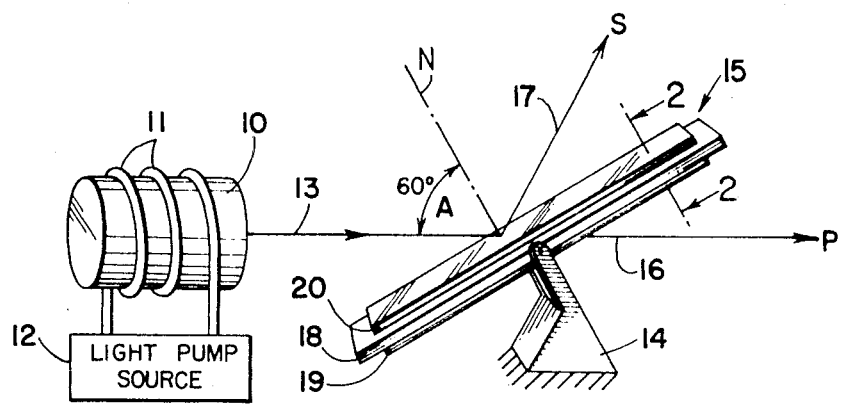
FIG. 1 is a schematic perspective view of a laser beam generator utilizing a single plate polarizer in accord with the invention.

Referring to FIG. 1, there is shown a laser beam generator including a laser rod 10 surrounded by a spiral flash lamp 11 powered from source 12. The laser beam is indicated at 13 and in the particular embodiment to be described has a wavelength of substantially 1.06 microns.

A mounting means 14 serves to position a single plate polarizer designated generally by the numeral 15 at an angle of incidence of substantially 60° to the laser beam 13. With the polarizer constructed in accord with the present invention, there results a substantially complete transmission of the laser beam component whose electric field vector is parallel to the plane of incidence of the plate. This component is designated by the letter P and indicated by the arrow 16 as passing through the plate. On the other hand, the laser beam component whose electric field vector is perpendicular or normal to the plane of incidence is substantially completely reflected. This component is designated by the letter S and its path is indicated by the line 17.

The plate polarizer itself includes a glass substrate 18 which may include a conventional antireflection coating 19 on its rear surface and multilayers of alternately high and low index refraction material coated on its front surface as indicated at 20.

Figure 2:
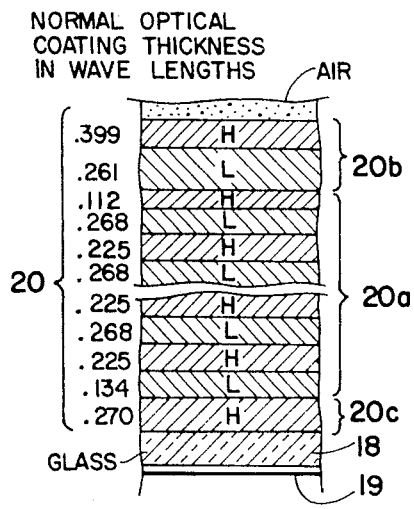
FIG. 2 is a greatly exaggerated fragmentary cross section of the polarizer taken in the direction of the arrows 2—2 of FIG. 1.

Referring particularly to the exaggerated cross-sectional fragmentary view of FIG. 2, the multilayers 20 include a central portion 20a of repeated high and low index of refraction materials, a first matching portion 20b, and a second matching portion 20c. The matching portion 20b provides a proper match between air and the central portion 20a and the second matching portion 20c provides a proper matching between the central portion 20a and the glass substrate 18.

In accord with the preferred embodiment of the invention, the central portion 20a terminates in half symmetrical sections at each end of respectively high and low index refraction material. These symmetrical half sections enable more efficient matching with the respective first and second matching portions to be realized. Proper matching as well as proper transmission and reflection of the respective components is achieved by carefully controlling the thickness of the layers. These thicknesses are determined by the wavelength of the laser beam, the angle of incidence, and the actual indexes of refraction of the layers, air, and the glass substrate.

In a specific embodiment constructed and used, the glass substrate has an index of refraction of substantially 1.51. The angle of incidence was chosen at 60° for optimum results and the laser beam at a wavelength of substantially 1.06 microns. The high index of refraction material was cerium oxide providing an index of refraction of substantially 2.30, although zinc sulfide could also be used. The low index of refraction material was magnesium fluoride having an index of refraction of substantially 1.38. The central portion 20a constituted 12 layers of the high and low index of refraction materials, the center 10 of which has equivalent oblique optical thicknesses in wavelengths of 0.208, and the end layers completing the half symmetrical section thicknesses of 0.104.

To provide optimum matching with the air, the first matching portion 20b cooperates with the first half symmetrical end section of the central portion. This first matching portion includes a layer of low index material of equivalent oblique optical thickness in wavelengths of 0.208 followed by a layer of high index material of equivalent oblique optical thickness in wavelength of 0.369. These two layers working with the first symmetrical half section of the central portion provide a very desirable match between the air and the central portion when the equivalent thicknesses in wavelengths as described are provided.

Matching of the other end of the central portion to the glass substrate is accomplished by a single layer of high index refraction material of equivalent oblique optical quarter wavelength thickness of 0.250 as illustrated at 20c in FIG. 2.

It must be borne in mind that the thicknesses in wavelengths described above are oblique optical equivalent thicknesses and must be converted either to actual physical thicknesses in order to control proper deposit of the coatings during manufacture or to normal (perpendicular) optical thickness if normal (perpendicular) optical monitoring is used for deposition. The equivalent oblique optical thickness in wavelengths as describe are calculated in accord with impedance concepts in the manner analogous to the construction of electrical filters and proper characteristic impedance terminations therefor and impedance matching theory.

The normal optical thickness in wavelengths for respective layers are shown in FIG. 2 and are set forth in the following table following the equivalent oblique optical thickness in wavelengths:

| Layer | Actual Index | Equivalent Oblique Optical Thickness in Wave Lengths | Normal Optical Coating Thickness in Wave Lengths |
| --- | --- | --- | --- |
| air | 1.00 | ...... | ...... |
| 1 | 2.30 | .369 | .399 |
| 2 | 1.38 | .203 | .261 |
| 3 | 2.30 | .104 | .112 |
| 4 | 1.38 | .208 | .268 |
| 5 | 2.30 | .208 | .225 |
| 6 | 1.38 | .208 | .268 |
| 7 | 2.30 | .208 | .225 |
| 8 | 1.38 | .208 | .268 |
| 9 | 2.30 | .208 | .225 |
| 10 | 1.38 | .208 | .268 |
| 11 | 2.30 | .208 | .225 |
| 12 | 1.38 | .208 | .268 |
| 13 | 2.30 | .208 | .225 |
| 14 | 1.38 | .104 | .134 |
| 15 | 2.30 | .250 | .270 |
| Substrate | 1.51 | ......... | ......... |

Figure 3:
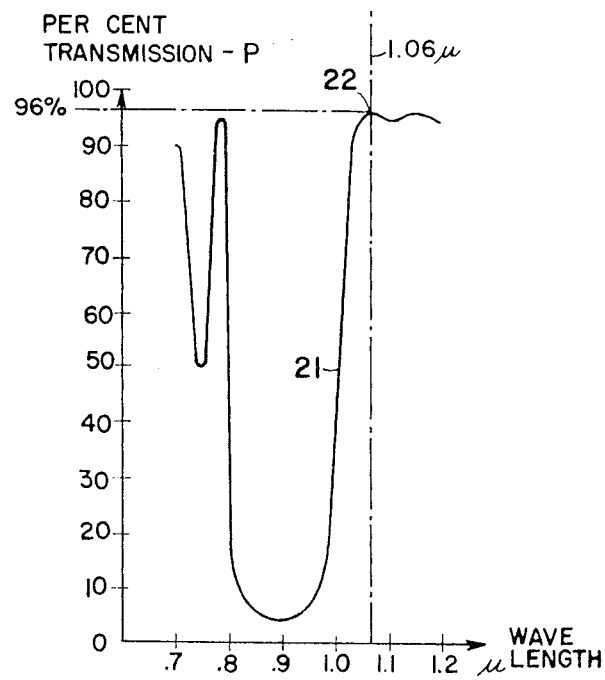
FIG. 3 is a plot illustrating transmission characteristics of the single plate polarizer for the P component of radiation; and, FIG. 4 is a plot similar to FIG. 3 but illustrating the transmission characteristics of the S component of radiation.

FIG. 3 illustrates the transmission characteristic of the P component of radiation when utilizing the single plate polarizer described in FIG. 2 with thicknesses in accord with the foregoing table. As shown, the transmission curve 21 has a peak of substantially 96 percent at the point 22 for a laser beam wavelength of 1.06 microns including the reflectivity resulting from the opposite surface of the substrate when uncoated. The effectiveness of the polarizer depends in large part on the fact that the laser beam has a narrow bandwidth in the vicinity of the 1.06 micron wavelength. It is this important characteristic of a laser beam that permits successful construction of an efficient single plate polarizer as described. For example, should the wavelength of the incident radiation deviate a small amount to, for example, 0.9 microns, there would be substantial reflection of the P component rather than transmission thereof.

Figure 4:
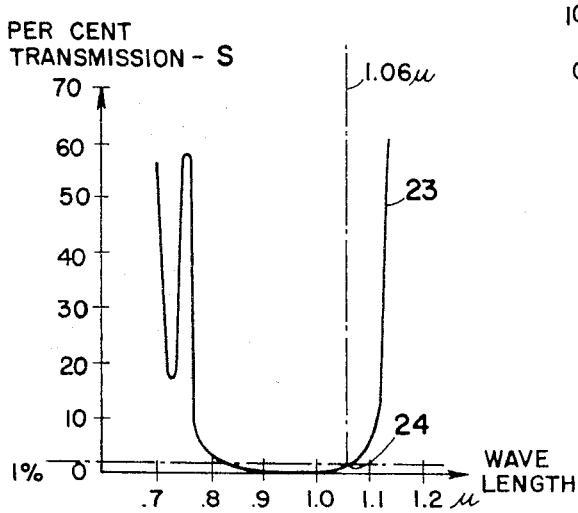

FIG. 4 illustrates the transmission characteristics for the S component and it will be noted from the plot 23 that for the 1.06 micron wavelength radiation, transmission is of the order of only 1 percent. Thus, this component is substantially completely reflected at least to the extent of 99 percent with the 15 layer configuration described. Other angles of incidence could be chosen. Also, the central portion could have more or less than the 12 layers described. Greater efficiency is realized the greater the number of layers in the central portion. Also, it should be understood that the central portion need not terminate in half symmetrical sections. However, the impedance matching is found to be most efficient when terminating the central portion in this manner.

The invention accordingly is not to be thought of as limited to the specific embodiment set forth as applicant's preferred construction for the particular wavelength involved.

What is claimed is:

1. A single plate laser beam polarizer comprising: a supporting substrate having multilayers of alternately high and low index of refraction materials coated on one surface thereof; and means for positioning said substrate such that its said one surface intercepts a laser beam of narrow bandwidth at a given angle of incidence, said multilayers including a central portion terminating in half symmetrical sections of high and low index materials; a first matching portion between the half symmetrical section of high index material and air and a second matching portion between the half symmetrical section of low index material and said supporting substrate, said multilayers having thicknesses related to the wavelength of said beam, the indexes of refraction of said materials, and said angle of incidence to permit transmission of that component of the beam whose electric field vector is parallel to the plane of incidence, and reflect substantially that component of the beam whose electric field vector is perpendicular to the plane incidence.

2. The subject matter of claim 1, in which said supporting substrate comprises glass, the surface of said glass opposite said one surface being provided with an antireflection coating.

3. The subject matter of claim 1, in which said central portion includes at least one layer of high index material and one layer of low index material sandwiched between said half symmetrical sections.

4. A single plate polarizer for a laser beam of substantially 1.06 microns wavelength, comprising, in combination: a substrate of glass having an index of refraction of substantially 1.51 ; multilayers of alternately high and low index of refraction materials, respectively having indexes of refraction of substantially 2.30 and 1.38 coated on one surface of said glass substrate; and means for positioning said substrate such that its said one surface intercepts said laser beam at an angle of incidence of substantially 60°, said multilayers including a central portion and first and second matching portions on either side of said central portion to provide a proper matching characteristic between said central portion and air and said central portion and said glass substrate respectively, the thicknesses of said multilayers being related to said wavelength angle of incidence, and indexes of refraction to provide high transmission of the beam component whose electric vector is parallel to the plane of incidence and low transmission to the beam component whose electric vector is perpendicular to said plane of incidence.

5. The subject matter of claim 4, in which said high index material is cerium oxide and said low index material is magnesium fluoride.

6. The subject matter of claim 4, in which said high index material is zinc sulfide and said low index material is magnesium fluoride.

7. The subject matter of claim 4, in which said central portion includes 12 layers of material, the center 10 layers being of 0.208 equivalent oblique optical wavelength thickness and the respective end layers constituting half symmetrical sections of high and low index materials of 0.104 equivalent oblique optical wavelength thickness, respectively, said first matching portion comprising two layers of high and low index of refraction material of 0.369 and 0.203 equivalent oblique optical wavelength thickness and said second matching portion comprising a single layer of high index material of one-quarter equivalent oblique optical wavelength thickness.

* * * * *